United States Patent [19]

Aharon

[11] 4,345,582

[45] Aug. 24, 1982

[54] SYSTEM FOR THE UTILIZATION OF SOLAR ENERGY

[76] Inventor: Naaman B. Aharon, Drori St. 14A, Rishon Litzion, Israel

[21] Appl. No.: 95,646

[22] Filed: Nov. 19, 1979

[51] Int. Cl.³ ............................................... F24J 3/02
[52] U.S. Cl. .................................... 126/424; 126/451
[58] Field of Search ............... 126/425, 426, 424, 438, 126/439, 451; 60/641, 641.8, 641.15

[56] References Cited

U.S. PATENT DOCUMENTS

| | | | |
|---|---|---|---|
| 3,466,119 | 9/1969 | Francia | 126/425 X |
| 3,892,433 | 1/1975 | Blake | 126/425 X |
| 3,996,917 | 12/1976 | Trihey | 126/425 |
| 4,102,326 | 7/1978 | Sommer | 126/425 |
| 4,203,426 | 5/1980 | Matlock et al. | 126/425 |
| 4,214,572 | 7/1980 | Gonder | 60/641 |

*Primary Examiner*—Allen M. Ostrager
*Attorney, Agent, or Firm*—Berger & Palmer

[57] ABSTRACT

A dynamic system for the utilization of solar energy which is most of the time in the ideal position in relation to the sun. Said device comprises at least one unit consisting of a solar collector and a stand carrying said collector, means for rotating the solar collector around its horizontal axis and means for rotating the solar collector and/or the stand around the vertical axis; means for simultaneous or independent actuation of the rotation means, means for the tracking control of said actuation means; and means for the transfer of the energy obtained.

14 Claims, 20 Drawing Figures

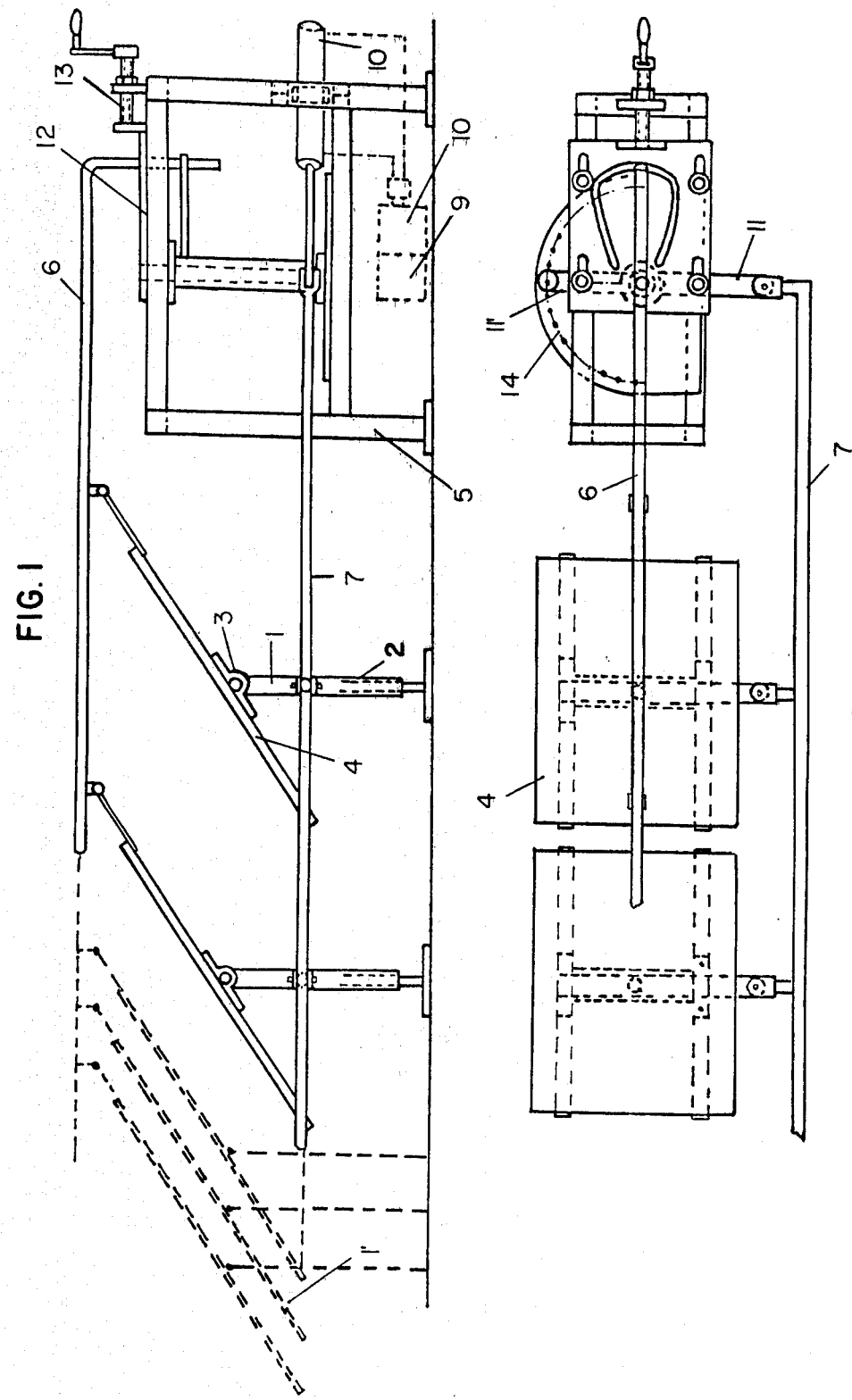

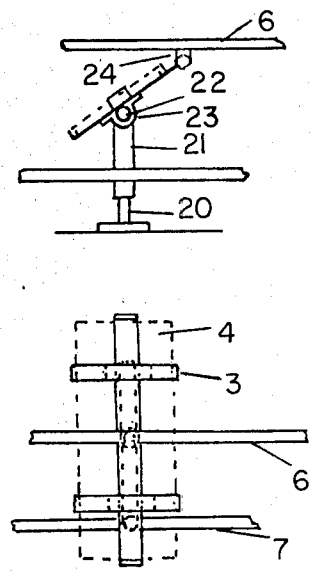
FIG. 3A
FIG. 3B
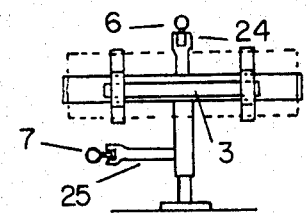
FIG. 3C
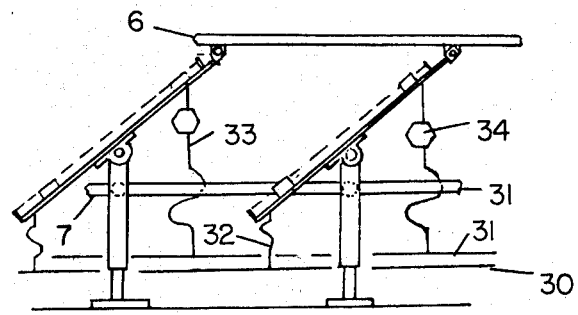
FIG. 4
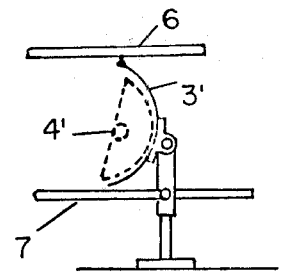
FIG. 5

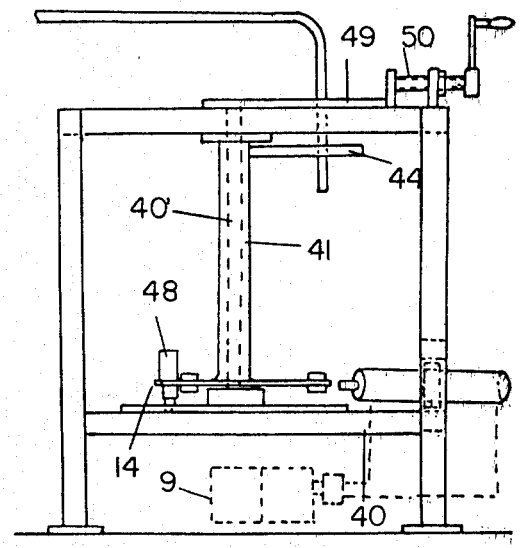
FIG. 6A
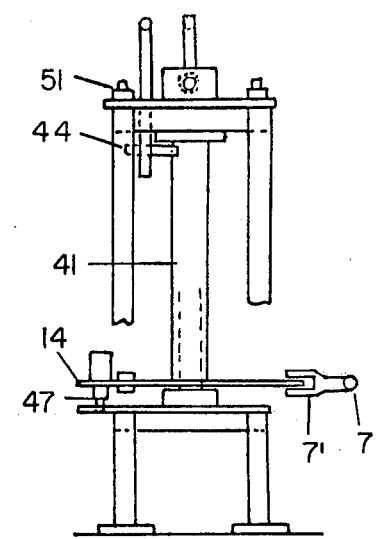
FIG. 6B
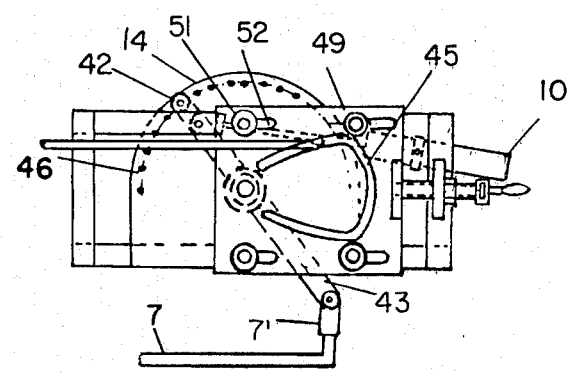
FIG. 6C
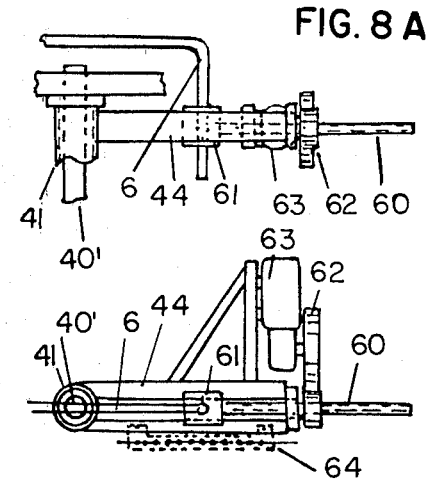
FIG. 8A
FIG. 8B

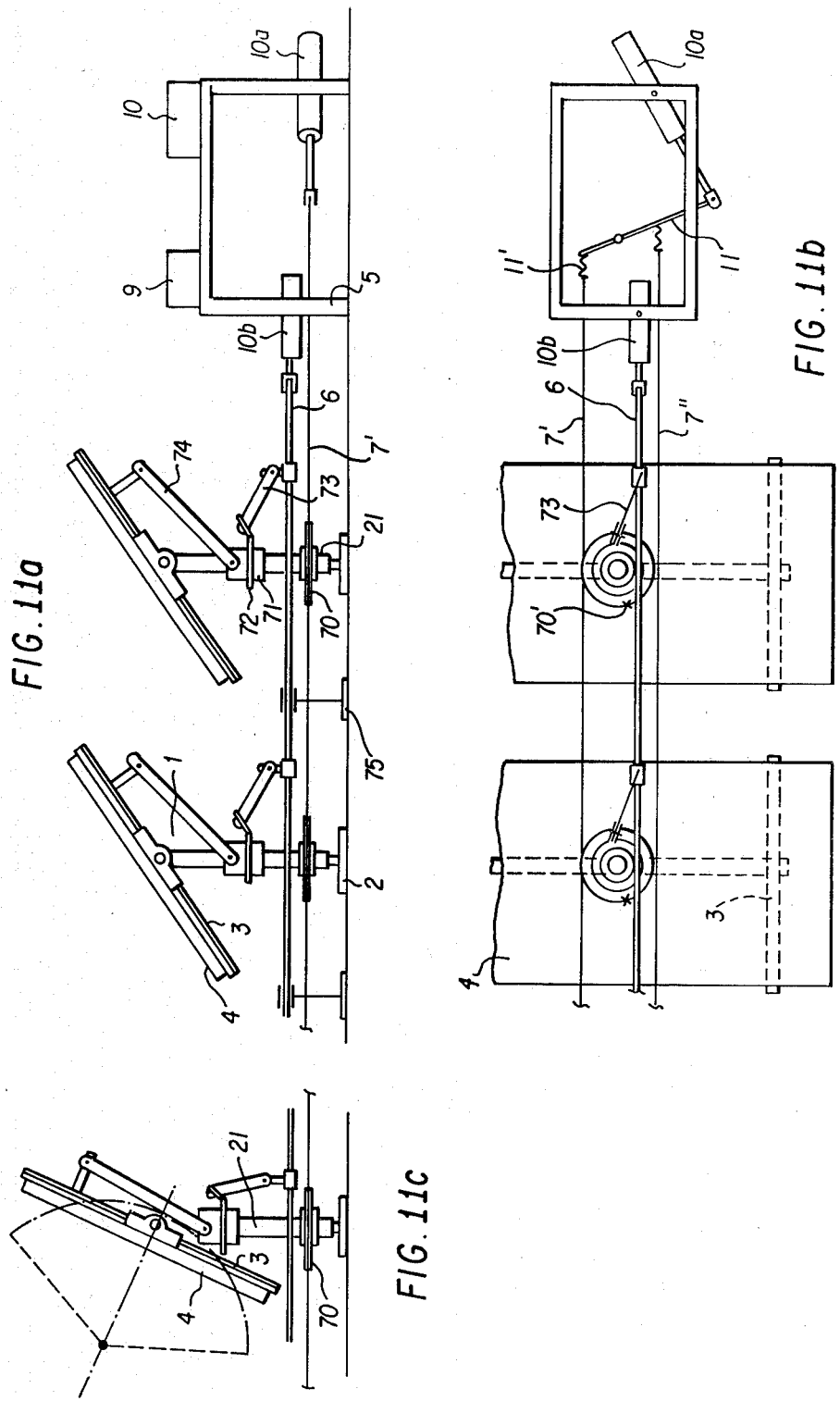

SYSTEM FOR THE UTILIZATION OF SOLAR ENERGY

The present invention relates to a system for the utilization of solar energy.

There are known various devices for the utilization of solar energy, in particular, the so-called domestic solar water heaters. All these known solar heaters are static devices, i.e. the collectors are in a fixed position relative to the sun. In order to get the maximum effect of solar energy it is essential that the surface area of the collector of the heater is directed perpendicular to the sun rays, in case that the collector of said solar heater is flat, or that the axis of such collector coincides with the sun rays in case that a concentrating solar collector is utilised. However, it is readily understood that this ideal position is achieved in said conventional devices only very rarely, namely mainly at mid-day and even more precisely at mid-day of some days in the course of the year.

Thus in the known solar heaters one can achieve, in general only a temperature of 70° C. and a efficiency of about 50%. The moment one tries to get higher temperatures, the efficiency is reduced. However, for most commercial purposes one requires an efficiency which is higher than 50% and working temperatures of more than 100°, and thus the known devices are uneconomical for most purposes.

It has therefore been desirable to devise a device which achieves the above purposes i.e., with which one gets a efficiency which is higher than 50% and at the same time working temperatures of more than 100° C.

It has now been found that the above purpose can be achieved to a large extent by devising a system which is not static but which is a dynamic one—i.e. which is most of the time in the ideal position i.e. in case of a flat solar collector perpendicular to the sun rays and in case of a concentrating collector the axis thereof coincides with the sun rays.

The present invention thus consists in a system for the utilisation of solar energy comprising at least one unit consisting of a solar collector and a stand carying said collector, means for rotating the solar collector around its horizontal axis (hereinafter called "horizontal means") and means for rotating the solar collector and/or the stand around the vertical axis (hereinafter called "vertical means"); means for the simultaneous or independent actuation of the rotation means (hereinafter called "actuation means") and means for the tracking control (hereinafter called "control means") of said actuation means; and means for the transfer of the energy obtained (hereinafter called "transfer means").

It is readily understood that the collector may be rotated either directly or via a base on which it rests and both possibilities are within the scope of the present invention.

A solar collector in connection with the present invention is any suitable device which utilises the energy of the sun e.g. commercially available flat or concentrating thermal collectors serving as part of thermal solar heaters; photovoltaic collectors for the production of electricity; etc.

It is readily understood that whereas for certain purposes, i.e. for the purposes for which solar heaters have so far been utilised, i.e. heating of water, one unit is sufficient.

However, in order to obtain larger quantities of solar energies, higher efficiency and higher temperatures, one such unit will not be sufficient as it is too cumbersome and too complicated to increase the size of the commercially available collectors and stands.

Thus, the device according to the present invention is not restricted to one unit but may comprise an unrestricted number of units. The number of units is restricted only by construction reasons, e.g. the forces required for the actuation means; the resistance of the device against external forces, etc.

All units are rotated simultaneously, they are at all times parallel to each other, and as they are following the position of the sun, are substantially at all times in the required ideal position.

The vertical and horizontal means may be coupled to each other, i.e. actuated by one actuation and control means only, or may be actuated separately. However one set of actuation means is sufficient for each kind of rotating means.

The movement of the collector, the basis and/or the stands may be a continuous one, i.e. they move continuously very slowly and thus achieve most of the time substantially the ideal position. However, this might be quite complicated, and therefore, one may construct the system according to the present invention in such a manner that the movement is performed in intervals only i.e., for instance, every quarter of an hour.

The rotating means are, e.g. appropriate axes provided with bearings.

The actuating means extend along the individual stands, connecting one to another in the same geometric position. They may be e.g., rods, cables, chains etc.

As control means, one may utilise accurate tracking electronic means ascertaining the continuous movement of all the collectors. However one may utilise also, for example, an electrical clock which sends at predetermined times, signals to the actuating means thus enabling the movement of all the collectors in intervals.

As transfer means there may be considered, in case of transfer as thermal energy, pipes conducting a suitable liquid, e.g. water. In case of transfer to electrical energy, suitable cables; etc.

The device works in principle as follows:

One fixes the starting angle both in the vertical and in the horizontal position and ascertains that the movement of the solar collector(s) starts when the sun is in a certain position. This can be achieved for instance, by way of a photo-voltaic cell. Thereafter the system follows the sun the whole day in such a manner that the collector(s) are substantially all the time in the ideal position in relation to the sun and the movement will be stopped at the end of the day, i.e. the moment there is not enough solar energy. The system is then brought back into the starting position. This may be performed by automatic means, e.g. certain electric signals or even by hand.

It is readily understood that the angle required varies to a certain extent with the season of the year.

Thus, the device is adjusted sometimes in the year for instance about every three months. However, it might be stated that in the average the angle of rotation around the vertical axis, required will be about 160°—i.e., one starts about 100° to the east and finishes 260° towards the west. The angle of rotation around the horizontal axis is about 30°–50°, i.e. starting from about 75° (from the horizon) up to about 25° in summer and about 45° in winter.

The material from which the various parts of the system according to the present invention is made is not a critical feature of the present invention. As indicated above, collector may be commercially available. All other parts should be resistant as much as possible to atmospheric conditions, e.g. weather and rain resistant.

The present invention will now be illustrated with reference to the accompanying drawings without being limited by them. In these drawings: (Corresponding parts are indicated in all Figs. by the same reference numerals).

FIG. 1 shows in a schematical manner a side view of a system according to the present invention;

FIG. 2 shows a top view of the system illustrated in FIG. 1;

FIGS. 3a-c show an unit comprising a flat plate energy collector;

FIG. 4 shows a side view of two units according to FIGS. 3 connected to each other by the actuating means illustrating also transfer means;

FIG. 5 shows a side view of an unit comprising a concentrating solar collector;

FIG. 6a shows in detail a side view of a control stand;

FIG. 6b shows a front view of the control stand of FIG. 6a;

FIG. 6c shows a top view of the upper part of the control stand of FIGS. 6, a and b.

Figure 9A:
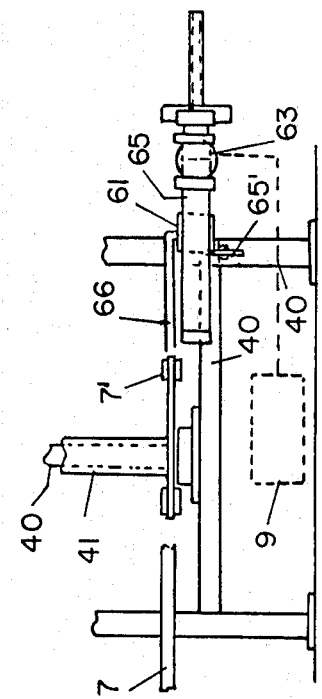
Figure 9B:
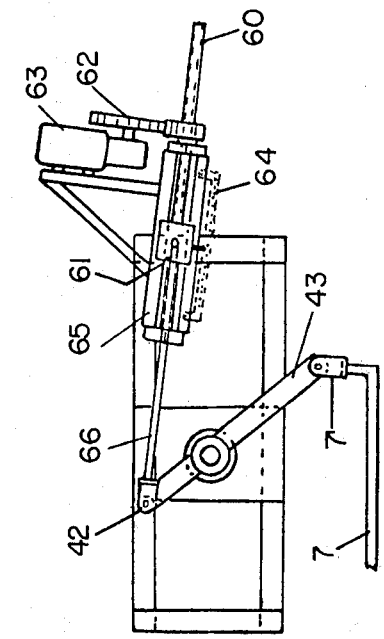
Figure 7A:
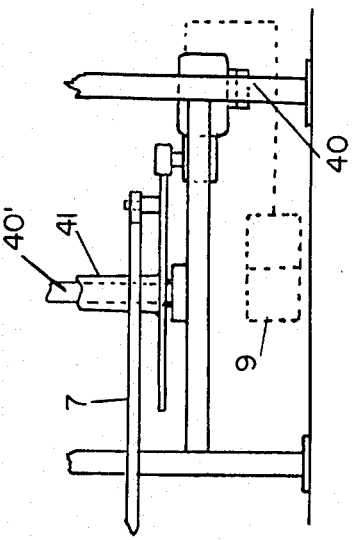
Figure 7B:
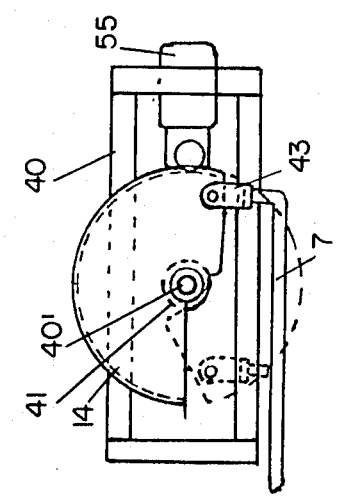
Figure 10A:
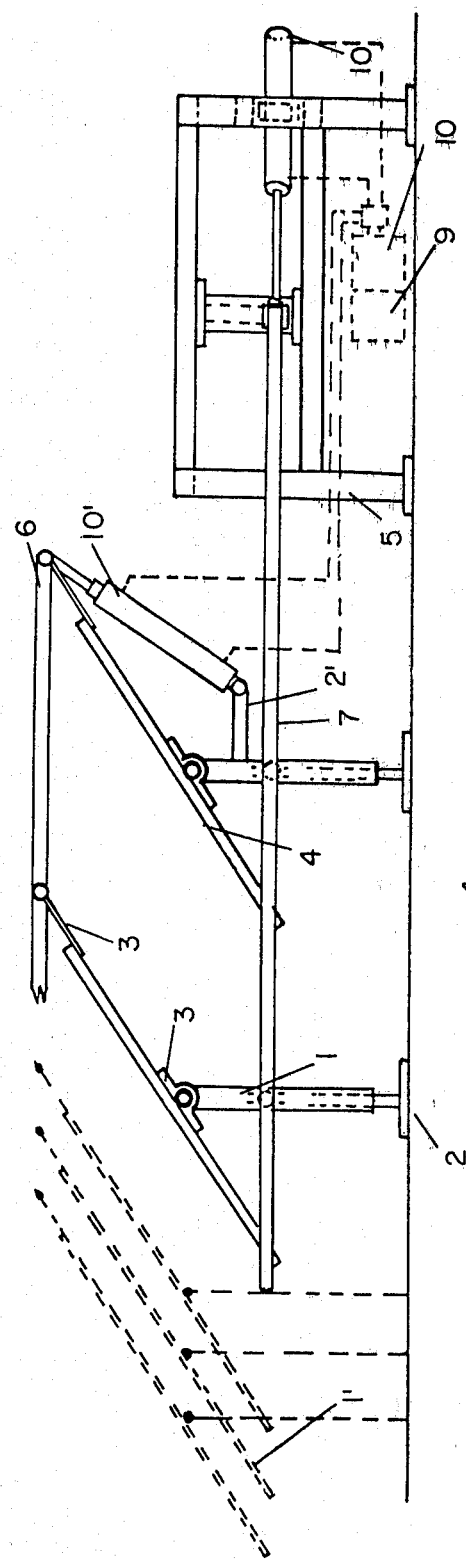

FIGS. 7a and b show a side view and a top view, respectively of another embodiment of the lower part of the control stand in FIG. 6;

FIGS. 8a and b show the side view and top view, respectively, of another embodiment of the upper part of the control stand shown in FIG. 6;

FIGS. 9a and b show a side view and a top view, respectively, of another embodiment of the lower part of the control stand as shown in FIG. 6; and FIGS. 10a and b show in a schematical manner a side view and top view, respectively, of another embodiment of the system.

FIGS. 11a and 11b show side and top views of another embodiment of my invention.

FIG. 11c is a side view of an individual collector of FIGS. 11a and 11b.

The device illustrated in FIGS. 1 and 2 comprises two units 1. Further units 1' are indicated by dashed lines showing that the numbers of units 1' is unrestricted.

Each unit 1 (for sake of clarity only unit 1 is marked with reference numerals) is composed of stand 2, cradle-like base 3 and flat solar collector 4.

Said units 1 are connected to control stand 5 by way of rod 6 (horizontal means) and rod 7 (vertical means).

Control stand 5 comprises post 9, power system 10, arms 11 and 11', actuating rods 6 and 7, respectively synchronising mechanism 12, adjusting mechanism 13 and movement mechanism 14.

Command post 9 is a system comprising a clock giving orders for the change of position in movement system 14, which system 14 is based on mechanical, electro-mechanical or hydraulic means. However, one may dispose of movement mechanism 14 and then command post 9 should comprise, e.g. electronic means comprising photo-electric cells, which enable a continuous movement and an automatic return to the starting position.

Movement mechanism 14 may be a round plate being provided with holes, a toothed wheel lead screw, carriage mechanism, hydraulic piston, or the like.

The device operates as follows:

In the morning when the sun rises command post 9 actuates via power system 10, arms 11 and 11', the movement of which is synchronised by mechanism 12, rods 6 and 7, respectively which move collector 4 and stand 2 in the required position indicated by mechanism 14. If desired there may be an additional power system which eliminates the need for synchronisation mechanism 12. At sun set time the device is by way of a signal or by hand set back into the starting position. Alternatively, said inclination may be fixed automatically provided that there are separate actuation means for each rotation means.

The desired starting inclination of collector 4 is fixed by adjustment mechanism 13, e.g. a screw. This has to be done periodically, e.g. each 2 months.

The stand illustrated in FIGS. 3a-c comprises base 20 from which extends rotatable rod 21. Rod 22 is rigidly perpendicularly connected to rod 21. Bearings 23 are mounted on rod 22 and carry base 3 carrying collector 4. Arm 24 is connected to the center of the upper end of base 3 and to rod 6 which rod 6 causes the movement around the horizontal axis thus determining the desired inclination angle. Rod 21 is connected via arm 25 to rod 7. Rod 7 causes the movement of rod(s) 21 around the vertical axis and thus determines the desired direction of the collector.

FIG. 4 illustrates two units as shown in FIG. 3 in series which are connected to each other by way of rods 6 and 7, respectively. Said rods 6 and 7 ascertain the simultaneous and parallel movement of all units. Besides the parts explained in connection with FIGS. 3a-c there are shown line 30, for the supply of cold liquid to all collectors 4 and line 31 for the transport of that liquid from all collectors 4. Flexible hose 32 serves for the transport of cold liquid from main line 30 to collector 4 and flexible hose 33 for the transport of hot liquid from collector 4 to line 31. Temperature sensor 34 enables the control of the temperature produced in the collectors.

The unit illustrated in FIG. 5 differs from that illustrated in FIGS. 3a-c in that flat collector 4 is replaced by concentrating collector 4' and base 3 is constructed as base 3' for said concentrating collector.

Control stand 5 shown in FIGS. 6a-c comprises frame 40 fixed to the earth in the middle of which perpendicularly to the earth extends rod 40', around which rotates part 41. Part 41 is actuated by arm 42 which in turn is actuated by power system 10. Arm 43 is connected to the other side of part 41 opposite to arm 42. Arm 43 actuates via element 7' rod 7 which causes in turn by actuating all stands 2 the rotation around the vertical axis of said stand 2.

Arm 44 is also rigidly connected to part 41. The vertical part of rod 6 is within a groove in said arm 44 and within groove 45. The movement of arm 44 causes rod 6 to move within said groove 45 and thus causes to correct inclination of collector 4.

Movement mechanism 14 is constituted by a plate being provided with holes 46, said plate being rigidly connected to frame 40. The movement of units 1 is performed in intervals, which are indicated by the distances of holes 46. Each hole 46 is provided with a closing mechanism e.g. pin 47 which is opened by way of mechanism 48 (hydraulic piston, electrical means or the like).

Movable plate 49 is moved by screw 50 and fixed to frame 40 by screws 51. The length of the movement of plate 49 is determined by screw 51 and by groove 52.

The movement of said plate 49 determines the position of groove 45. Plate 49 is moved sometimes in the year in order to ascertain the correct inclination of collectors 4 in accordance to the season.

Power system 10 is composed of a cylinder and a hydraulic pressure unit. The power system may also be electrically based using an electrical engine. It is the only power system required in order to actuate the system. The movements of rods 6 and 7 are synchronised by arms 43, 44 plate 49 and groove 45.

Command post 9 constitutes a system following the movements of the sun and giving signals to power system 10, thus enabling a continuous movement (not shown here) or a clock or the like giving the signal ascertaining the correct intervals of movement.

In the control stand shown in FIGS. 7a and b the movement of the entire system is a continuous one. Said device comprises motor 55. Said motor 55 is mounted on frame 40 and rotates plate 14 which is a toothed wheel. Plate 14 rotates together with arm 43, actuating rod 7 and part 41 passing the movement on to the upper part of the control stand.

The movement is governed by command post 9. There are two speeds; one slow during the day and one faster for setting the device back to its starting position.

In the upper part of the control stand shown in FIGS. 8a and b another mechanism is illustrated.

The distance of the vertical axis of rod 6 to axis 40' is determined by a carriage mechanism which transforms the rotation movement to a longitudinal one. Said mechanism is actuated by gear motor 63, gear 62 and screw 60 which push block 61 moving in groove 46 with arms 44. Thus the position of groove 45 is fixed.

Gear motor 63, gear 62 and screw 60 may be replaced by other suitable actuating means, e.g. a piston.

It is readily understood from FIGS. 8a and b that the horizontal means can be actuated separately and independently.

FIGS. 9a and b illustrate a carriage mechanism replacing power system 10. Said mechanism is constituted by gear motor 63, gear 62 and screw 60 which push block 61 connected to rod 66. The movement of rod 66 causes arm 42 to rotate. All other movements are performed in the same manner as described in FIG. 6.

Element 64 synchronises the movement of the system with the movement of the sun.

Figure 10B:
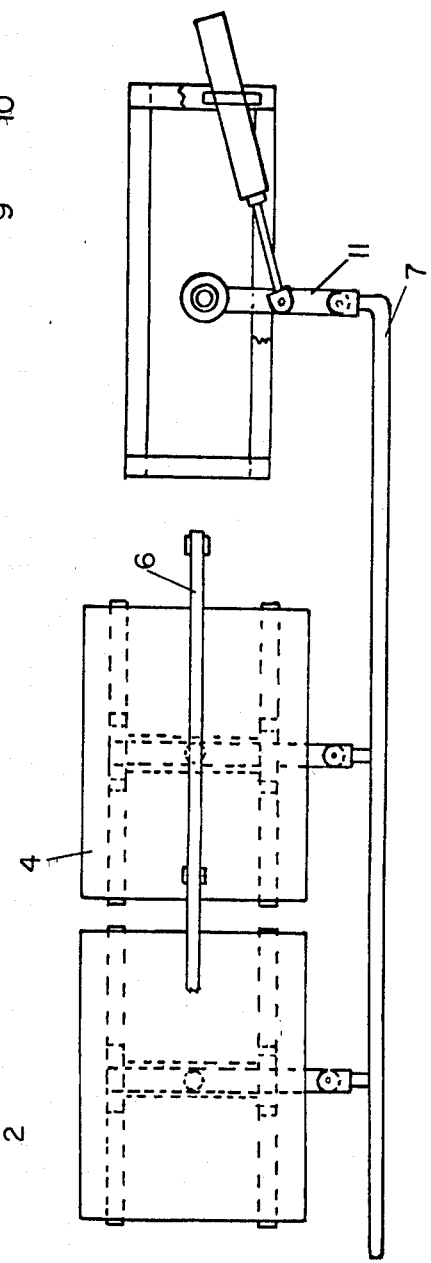

The device illustrated in FIGS. 10a and 10b differs from that illustrated in FIGS. 1 and 2 in that the vertical and horizontal means are actuated separately and that said actuation is not synchronised. Thus, the vertical means are actuated from control stand 5 via actuating rod 7 whereas the horizontal means are actuated from stand 2 via actuating rod 6 and piston 10' and arm 2'.

The device illustrated in FIGS. 11a and 11b show two units 1. It is readily understood that the number of units 1 is unrestricted as shown in FIGS. 1 and 2.

As shown also in FIG. 10 the device in FIG. 11 actuates separately the vertical and horizontal means. The device shown in FIG. 11 has very important advantages in that it allows greater movement around the two axes without any danger of mechanical lock in the extreme conditions.

In FIG. 11c one can see a flat collector standing in a steep angle as required in the early hours of the morning or in the late hours of the evening. It becomes also apparent that this device is suitable also for the erection of concentrating collectors.

The embodiment illustrated in FIGS. 11a–c is constructed as follows:

Units 1 are connected to control stand 5 by way of rod 6 (horizontal means) which rod 6 is moving along all stand 2 in axial guides 75, and by two cables (or chains) 7' and 7" (vertical means).

Control stand 5 comprises post 9, power system 10, piston 10-a actuating arm 11 which pulls cables 7' and 7" via springs 11' thus causing cable wheels 70 (or chain wheels) to turn right or left. Wheels 70 are connected rigidly to rotatable rods 21 which rotate while turning the collector around its vertical axis. First cable 7' is wound entirely around each wheel 70 and is fixed in point 70' to the wheel thus avoiding any possibility of slipping between the cable and the wheel. Since all wheels 70 are mounted on units 1 in the same manner all the collectors rotate parallel around their vertical axis. Return cable 7" is connected only to the last wheel 70 of the last stand, it runs freely along the row of stands 2 until it reaches arm 11. Cable 7" causes a movement in units 1 which is opposite to that caused by first cable 7'.

The angle of rotation in each direction can be greater than 90°, so that the total tracing in after the sun or the total rotation of the collector around its vertical axis is greater than 180°. In fact, each collector can rotate a complete revolution.

Piston 10b in control stand 5 pulls or pushes rod 6, that is connected via rod 73 to slipping ring 72. Ring 72 is mounted in a slot on movable center 71 which is connected via rod 74 to the cradle-like base 3 in which the collector is erected. When rod 6 is pushed or pulled it transfers its motion via rod 73 and slipping ring 72 to movable center 71 which goes up and down on rod 21, pushing or pulling rod 74 that rotates cradle-like base 3 with the collector mounted on it around the horizontal axis.

Movable center 71 turns together with rod 21, since it is connected by rod 74 to cradle-like base 3 that is connected rigidly to rod 21. Slipping ring 72 stages always in the same direction because of rod 73.

Bearings 75 holds rod 6 in place, so that it can transfer the motion without moving from its axle.

This construction is unique and enables free motion of the collector both around its vertical and horizontal axes without any regard to is position and without any possibility of mechanical locking in the extreme positions of the collector.

What is claimed is:

1. A system for the utilization of solar energy comprising a plurality of units operating together, each of said units comprising a solar collector mounted on a stand carrying said solar collector, horizontal rotation means connected to each unit for rotating a respective solar collector around the horizontal axis and vertical rotation means for rotating each stand and its respective solar collector around the vertical axis, horizontal and vertical actuation means for actuation of the horizontal and vertical rotation means, tracking means for tracking the control of said actuation means, said actuation means including a central control post connected to said horizontal and vertical rotation means to simultaneously control said units, and a separate stand for housing at least a portion of said horizontal and vertical actuating means.

2. The invention as set forth in claim 1, wherein said actuating means comprises actuating rods connected between said stands of said units and said separate stand, said actuating rods being movable to control the position of said stands to control the position of the solar collectors.

3. The invention as set forth in claim 1, wherein said vertical rotation means comprises a first cable between said separate stand and said stands of said units, each of said units comprising a wheel rotatable about said vertical axis which coupled to a respective stand, said cable being coupled to each of said wheels to simultaneously rotate each of said stands about said vertical axis.

4. The invention as set forth in claim 3, wherein said cable is entirely wrapped around each wheel at each stand.

5. The invention as set forth in claim 3, further comprising a return cable connected between said separate stand and the wheel of the last of said units, said return cable rotating all of said stands in one direction which is opposite to the direction of rotation of first cable.

6. The invention as set forth in claim 4, wherein said first cable is fixed at a point to each of said wheels in each of said units.

7. The invention as set forth in claim 3, wherein said vertical rotation means comprises means to rotate each of said stands simultaneously about said vertical axis for a complete revolution.

8. The invention as set forth in claim 1, wherein said solar collector is a flat collector.

9. The invention as set forth in claim 1, wherein said solar collector is a concentrating collector.

10. The invention as set forth in claim 1, wherein said solar collector comprises photovoltaic cells.

11. The invention as set forth in claim 1, further comprising synchronizing means connected to said horizontal and vertical actuating means for synchronizing the movement of both of said actuating means.

12. The invention as set forth in claim 1, wherein each of said horizontal and vertical actuating means are independently controlled.

13. The invention as set forth in claim 1, further comprising means to continuously move said horizontal and vertical actuating means.

14. The invention as set forth in claim 1, further comprising means to move said horizontal and vertical actuating means in intervals.

* * * * *